United States Patent [19]

Meyer

[11] Patent Number: 4,859,176
[45] Date of Patent: Aug. 22, 1989

[54] HEATER CLAMP FOR INJECTION MOLDING

[75] Inventor: Stephen R. Meyer, Savage, Minn.

[73] Assignee: Rosemount Inc., Eden Prairie, Minn.

[21] Appl. No.: 249,663

[22] Filed: Sep. 27, 1988

[51] Int. Cl.$^4$ ................................................ F24J 3/00
[52] U.S. Cl. .................................... 432/225; 432/226; 432/227
[58] Field of Search ............... 432/225, 226, 227, 229, 432/231, 183, 184, 10

[56] References Cited

U.S. PATENT DOCUMENTS

| | | | |
|---|---|---|---|
| 3,168,640 | 2/1965 | Rosenthal | 432/227 |
| 4,449,925 | 5/1984 | Williams | 432/226 |
| 4,515,562 | 5/1985 | Williams | 432/226 |
| 4,673,122 | 6/1987 | Dubey | 432/225 |

Primary Examiner—Henry C. Yuen
Attorney, Agent, or Firm—Kinney & Lange

[57] ABSTRACT

A clamp for securing a heater element to an injector barrel that includes a tube disposed about the heater element having a slit extending along the entire length of the tube which forms slit edges extending between ends of the tube. Clips extend about the tube and have central clip portions slidably engaging the tube by the slit edges. The clips are joined to a pair of clip pivots which define a pivotal axis substantially normal to the slit edges and extend through the tube at a location spaced away from the slit edges. The clips pivot with respect to the tube by using adjustment screws such that the central clip portion slides along the length of the tube to compress the tube around the heater element.

17 Claims, 3 Drawing Sheets

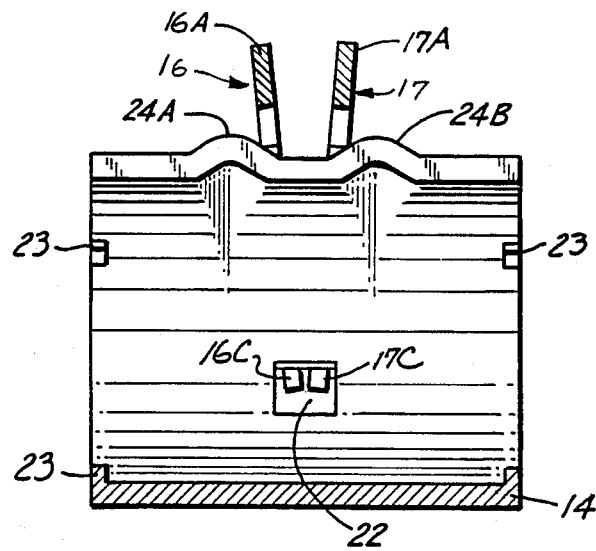
Fig. 3
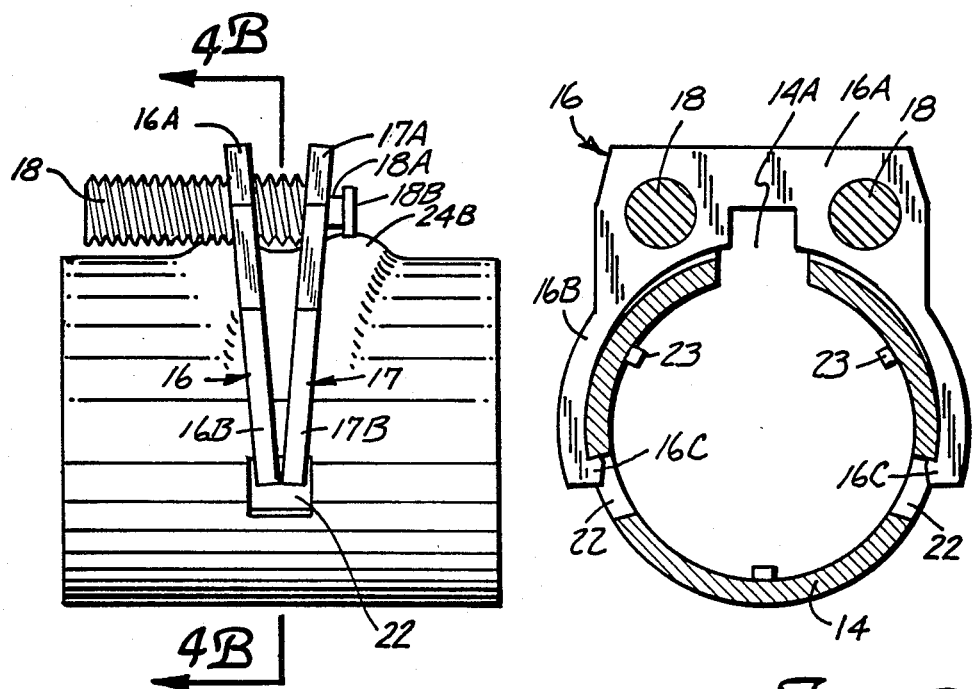
Fig. 4A
Fig. 4B

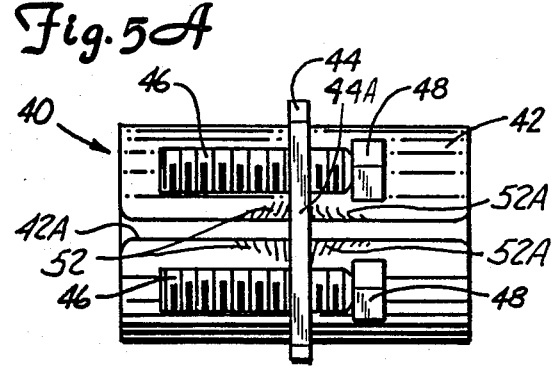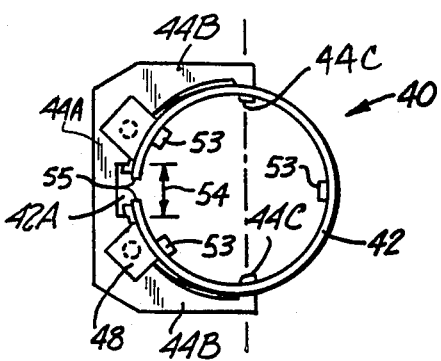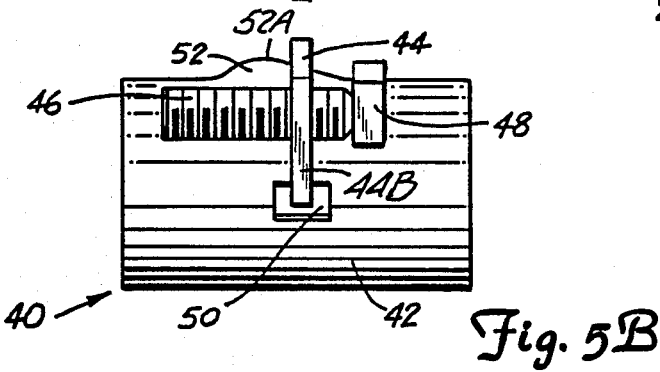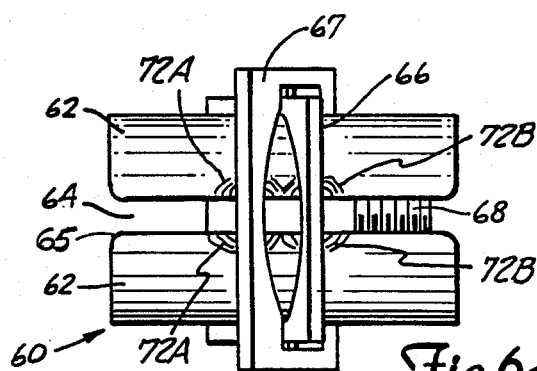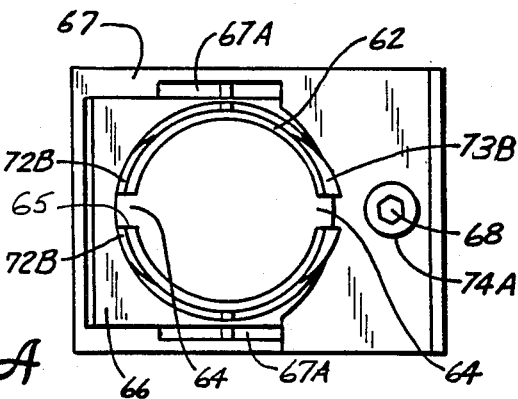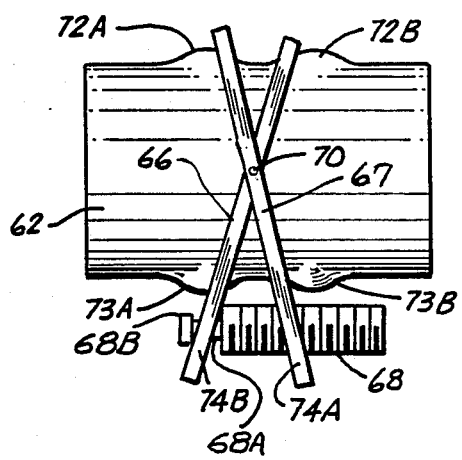

HEATER CLAMP FOR INJECTION MOLDING

BACKGROUND OF THE INVENTION

1. Field of the Invention

The present invention relates to the field of injection molding. In particular, the present invention relates to a heater clamp which secures a heater element around a cylindrical injector barrel used to inject thermoplastic materials into molds.

2. Description of the Prior Art

Injection molding is a production process for converting thermoplastic materials into molded articles of relatively intricate shapes, at fast production rates, and with good dimensional accuracy. The basic injection molding process for thermoplastics involves the injection, under high pressure, of a predetermined quantity of heated and plasticized material into a relatively cool mold, where the material solidifies and from which the resultant product is subsequently removed.

A helical heater element is held in close thermal contact with a round cylindrical barrel by a clamp designed to provide uniform clamping pressure so the heater is in uniform thermal contact with the injector barrel. The heater element, the clamp, and the injector barrel are disposed in a blind hole where space is limited. The heater clamp must be tightened while the clamp is in place in the blind hole.

A problem with prior art clamps using adjusting screws at right angles to the barrel axis has been the difficulty of using a tool (hex key, Allen wrench, screwdriver, etc.) to turn the adjustment screw in the injection molding machine. When the screw extends across the blind hole, it can be difficult to see the screw and a maintenance person has difficulty in adjusting the screw. Visibility from the front of the blind hole is blocked by a female mold which can be slid only a limited distance away from the injector barrel without disassembling the production setup. The swing or travel of the adjusting tool on a screw conventionally mounted is restricted by the blind hole and the clamp itself so that the tool may have to be reinserted several times to complete an adjustment. It is desired to have a clamp which can be tightened using a tool that can be easily placed on the tightening screw for the clamp.

SUMMARY OF THE INVENTION

The present invention relates to a clamp for an injection molding machine heater in a blind hole which can be adjusted with an adjustment screw that rotates about an axis parallel to the axis of the heater. The device includes a clamp tube disposed about the heater element, and clips which extend at least partway about the tube, and adjustment screws used to pivot the clips with respect to the tube. As shown, the clamp tube has a slit extending along its length. The opposite edges of the slit are to be moved together for clamping, and the pivoting clamp clips span the slit and pivot about an axis perpendicular to the axis of the tube to act on cam type members formed on the tube to effect the tightening or clamping of the tube. The clamp clips are actuated by pivoting them so the clip portion that spans the slit moves in a longitudinal direction of the tube to actuate the camming effect. The clips can be C-shaped and have ears which fit in openings in the sides of the tube and are pivoted on a pivotal axis substantially normal to the slit edges and which axis extends across the tube at a location spaced away from the edges of the slit. The drive end of the clamping screw used can be positioned near the open end of the blind hole and can be seen for operation and for access of an adjustment tool. The drive end faces the open end of the blind hole so a tool can be easily engaged and the tool can be rotated through a large arc to reduce the number of times that the adjustment tool has to be inserted to complete the tightening or adjustment.

The installation of the adjustment tool is also more compatible with conventional torque wrenches for adjusting the screw because the adjustment tool does not have to be specially designed to fit into the narrow clearances in the blind hole.

The cams on which the clamping clips act are formed as raised, formed, sloped surfaces on the clamp tube adjacent the edges of the slit. The sloped surfaces cam the edges of the slit together to cause tightening or compression on the heater element which increases rapidly over a short pivotal stroke of the clip (or clips) to reduce alignment problems with the adjustment screws and clips.

In one preferred embodiment of the present invention, stop blocks are welded to the tube so that only a single clip is needed, and in other embodiments two actuating clips that are loaded against each other are shown.

In another preferred embodiment, the tube is formed in two sections, thus forming two slits on opposite sides of the tube. Raised sloped cam surfaces are provided along the sides or edges of both slits, and a single adjustment screw is used.

BRIEF DESCRIPTION OF THE DRAWINGS

FIG. 3 is a sectional view of the clamp tube alone taken along substantially the same line as FIG. 1.

FIG. 4A is a side elevational view showing the clamp tube, the clips, and the adjustment screws of the heater clamp of FIG. 1.

FIG. 4B is a sectional view taken along line 4B—4B of FIG. 4A.

FIG. 5A is a plan view showing another preferred embodiment of the heater clamp of the present invention.

FIG. 5B is a side elevational view of the heater clamp shown in FIG. 5A.

FIG. 5C is a rear end view of the heater clamp shown in FIG. 5A.

FIG. 6A is a plan view showing still another preferred embodiment of the heater clamp of the present invention.

FIG. 6B is a side elevational view of the heater clamp shown in FIG. 6A.

FIG. 6C is a front end view of the heater clamp shown in FIGS. 6A and 6B.

DETAILED DESCRIPTION OF THE PREFERRED EMBODIMENTS

Figure 1:
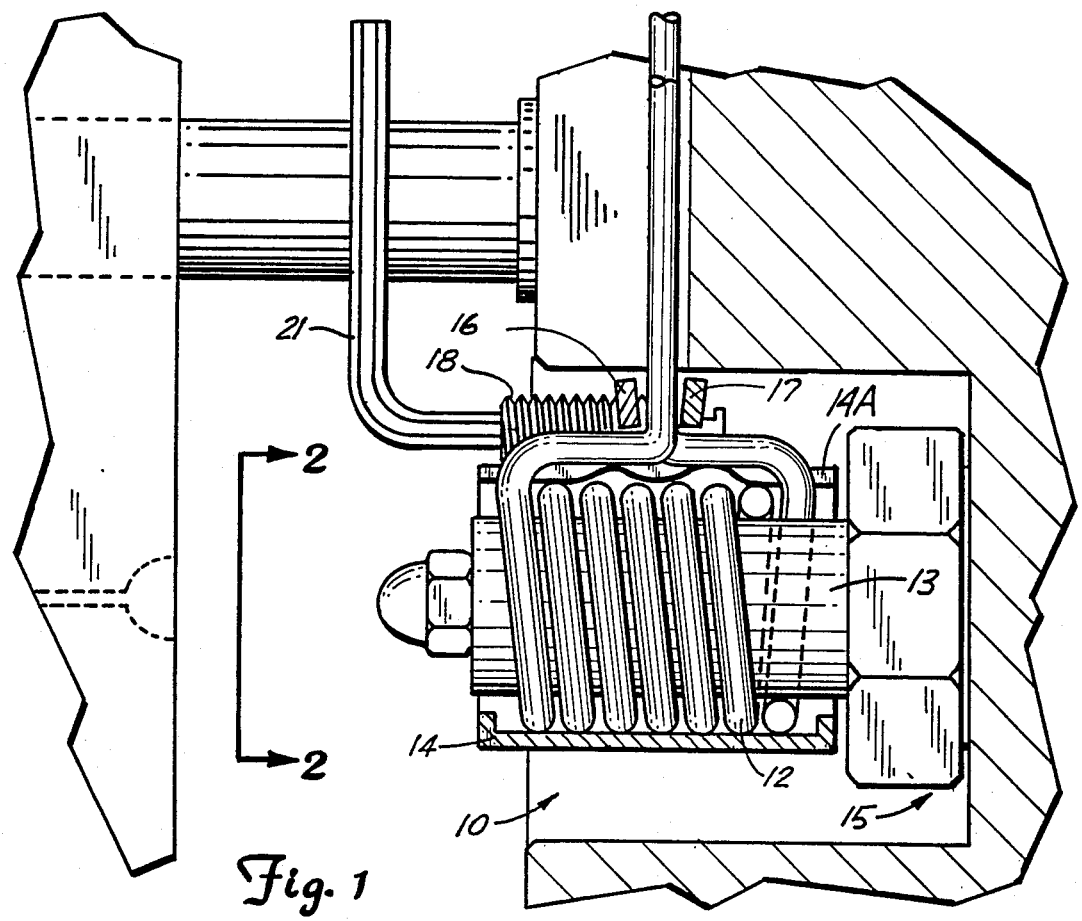
FIG. 1 is a longitudinal sectional view of one preferred embodiment of the heater clamp of the present invention shown in place in a blind hole of an extruder and on a heater assembly.

A heater clamp 10 in the form shown in FIGS. 1–4B includes a clamp tube 14 which surrounds the heater element 12. The heater element surrounds an injector barrel 13 which is part of an injection molding system 15.

The clamp tube 14 has a longitudinal slit 14A on the top of the clamp. The ends of the heater element extend upwardly through the slit 14A. The clamp tube is actuated (the slit edges are clamped together) by a pair of C-shaped clips 16 and 17. The clips 16 and 17 are pivotally attached to the tube 14, and have top portions 16A and 17A which span the slit 14A. The top portions can be moved along the tube 14 in longitudinal direction to act on the surfaces of cams 24A and 24B (see FIG. 3) on the tube to tend to close the slit and clamp the tube onto the heater element 12. The heater element 12 is thus clamped to injector barrel 13. As shown, the clips 16 and 17 are operated with a pair of adjustment screws 18.

Figure 2:
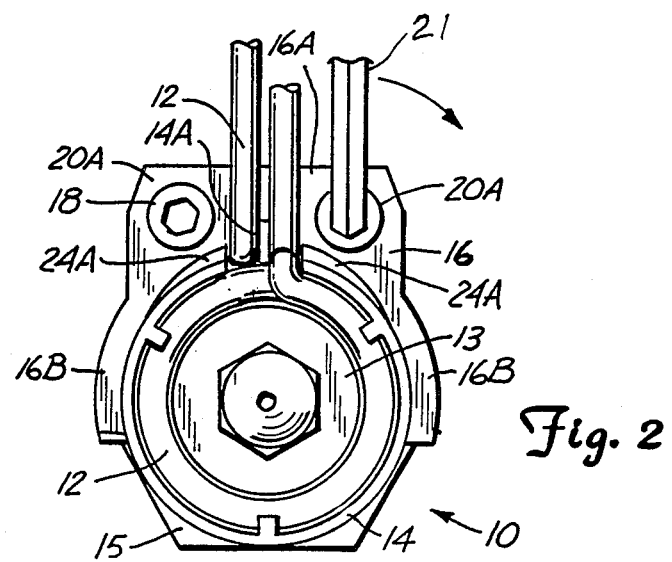
FIG. 2 is a front end view of the heater assembly shown in FIG. 1 and taken along line 2—2 in FIG. 1.

As can be seen in FIG. 2, tube 14 substantially surrounds the heater element 12. The tube 14 includes tabs 23 located on the inner surface of and on both ends of the tube. As can be seen in FIGS. 4A and 4B, the tabs 23 are evenly spaced around the circumference of the tube 14 and hold the heater element 12 within the interior of the tube when clamping the tube 14 onto the heater element 12.

As shown in FIGS. 4A and 4B, clips 16 and 17 extend partially around the tube 14 and have side legs 16B and 17B ending on in-turned ears 16C and 17C. The ears 16C and 17C are pivoted in slots 22 provided on opposite sides of the tube 14. Clips 16 and 17 are inclined in opposite directions outwardly from the slots 22.

Two cams 24A are formed in the tube 14 on opposite sides of the slit 14A, at a first axial location, and two cams 24B are formed on opposite sides of slit 14A spaced axially inwardly from cams 24A. Both of the clips 16 and 17 are positioned between the cams 24A and 24B, that is, each of the cams 24A and 24B is between a respective end of the tube 14 and the respective adjacent clip.

The central portions 16A and 17A of the clips 16 and 17 can be spread apart longitudinally with the actuator screws 18.

As shown, the screws 18 are threaded through treaded openings 20A in the central portion 16A of the clip 16 and the screws have end shank portions 18A rotatably mounted in aligning openings in central portion 17A of clip 17. A headed end 18B on each of the shank portions 18A is optional and keeps the screws 18 retained in the respective openings of clip 17 so the screws 18 can bear on the central portion 17A of clip 17 as the screw is threaded to force the central portions 16A and 17A of the clips 16 and 17 apart. The clips 16 and 17 will pivot in the slots 22 on their respective ears 16C and 17C, and an inner edge of clip 16 will act against the two cams 24A on opposite sides of the slit 14A. An inner edge of clip 17 will act on the two cams 24B on opposite sides of the slit 14A to move the slit edges together to clamp the tube 14 onto the heater element 12.

The adjustment screws 18 have axes that extend substantially parallel to the central axis of the tube 14 and thus are substantially parallel to the central axis of the injector barrel 13, and are tightened with an adjustment tool 21 such as a hex key or Allen wrench, as shown in FIGS. 1 and 2. The alignment of the screws 18 changes as the clip 16 rotates about its pivotal ears 16C.

Clamp 10 is located in a blind hole (with one closed or inaccessible end) in the injection molding system 15. If cross screws are used, they can be difficult to see and difficult to guide an adjustment tool 21 into adjustment screws. In this preferred embodiment, clamp 10 is provided with adjustment screws 18 aligned substantially parallel to the injector barrel 13. The ends of adjustment screws 18 can be more easily seen and the adjustment tool 21 can be rotated through a large arc which reduces the number of times that the adjustment tool 21 has to be inserted to complete the tightening or adjustment operation.

A heater clamp 40 in a second form of the invention shown in FIGS. 5A-5C includes a split tube 42 for surrounding a heater element (not shown). The clamp 40 includes a single C-shaped clip 44. The clip 44 has a top cross member 44A, side legs 44B and pivot ears 44C. The clip 44 is pivotally attached to the tube 42, and the top cross member can be moved longitudinally with respect to the tube 40 for actuation. The clip 44 is operated (pivoted) with a pair of adjustment screws or actuating screws 46. Tube 42 surrounds a heater element such as heater element 12 and when clamped secures the heater element 12 to an injector barrel of an injection molding system (similar to that shown in FIGS. 1 and 2).

The tube 42 includes tabs 53 located on the inner surface of and on both ends of the tube. As can be seen in FIG. 5C, the tabs 53 are evenly spaced around the circumference of the tube 42 and hold a heater element within the interior of the tube when clamping the tube onto the heater element.

As shown in FIGS. 5A-5C, clip legs 44B extend partially around the tube 42 and pivot ears 44C are pivoted in slots or openings 50 provided on opposite sides of the tube 42. Clip 44 pivots about an axis perpendicular to the longitudinal axis of the tube 42. The clip 44 central portion 44A has an internal edge adjacent tube 14 and this edge is adjacent to cams 52 (FIG. 5B) which are formed on tube 42 on opposite sides of a slit 42A having spaced facing edge surfaces 55. A pair of stop blocks 48 are welded to the tube 42 on opposite sides of the slit 42A spaced axially from the cams 52. The clip 44 is located between the stop blocks 48 and a cam surface 52A of cam 52.

As shown, the screws 46 are threaded through openings in the central portion 44A of the clip 44 and rotate and bear against stop blocks 48, respectively. As the screws 46 are placed under compression against the stop blocks 48, the clip 44 will pivot in the slots 50 on its ears 44C, and will move along the cam surfaces 52A of cams 52 to move the slit edges 55 of the tube 42 together to clamp the tube onto a heater element.

The adjustment screws 46 have axes that extend substantially parallel to the central axis of the tube 42 and thus are parallel to the central axis of the injector barrel (not shown), and are tightened with an adjustment tool such as a hex key or Allen wrench (similar to that shown in FIGS. 1 and 2). The alignment of screws 46 changes as clip 44 rotates and blocks 48 must be large enough to accommodate the alignment changes.

Although clamp 40 may be located in a blind hole in an injection molding system, the ends of adjustment screws 46 can be more easily seen and the adjustment tool can be rotated through a large arc, which reduces the number of times the adjustment tool has to be inserted into the adjustment screws to complete the tightening or adjustment operation.

A heater clamp 60 in a further modified form shown in FIGS. 6A-6C includes a split tube 62 which surrounds a heater element (not shown). The clamp is actuated by a pair of clamping clips 66 and 67. The clips 66 and 67 have central openings through which tube 62 extends. The clamp clips completely surround the tube 62, and are pivotally mounted to each other with pivot pins 70. The top and bottom parts of the clips can thus be moved relative to each other in a scissors action to act on cam surfaces on both the top and bottoms of the tube to clamp the tube 62 onto the heater element. As shown, the clips 66 and 67 are operated (pivoted relative to one another) with an adjustment screw 68. When tube 62 is clamped, it secures a heater to an injector barrel of an injection molding system (similar to that shown in FIGS. 1 and 2).

The tube 62 is formed in two sections or half-shells and thus has two longitudinal extending slits 64, each with facing slit edges 65.

As shown in FIG. 6A–6C, clips 66 and 67 are rectangular in outer peripheral shape with circular to slightly elliptical holes. Clip 67 is wider than clip 66, and has recesses 67A on both sides of the clip, such that clip 66 can extend through the recesses 67A of clip 67 to allow the clips 66 and 67 to be attached to each other with the pivot pins 70. As shown, clips 66 and 67 cross one another and are inclined in opposite directions outwardly from the pivot pins 70 in scissor form.

A pair of cams 72A are aligned and on opposite sides of the top slit 64 and a pair of cams 72B are aligned and on opposite sides of the same top slit 64, but cams 72B are spaced axially from cams 72A. A pair of cams 73A are provided on opposite sides of the bottom slit 64 in alignment with cams 72A and a pair of cams 73A are also provided and axially spaced from cams 73A.

Clips 66 and 67 span both of the slits 64 on the top and bottoms of the tube. First ends of both of the clips 66 and 67 are locked between cams 72A and 72B, and second ends of both clips 66 and 67 are positioned between cams 73A and 73B. The top portion of clip 67 lies adjacent to top cams 72A, and the bottom portion of clip 67 lies adjacent to bottom cam 73B. Similarly, the top portion of clip 66 lies adjacent to the top cam 72B, and the bottom portion of clip 66 lies adjacent to bottom cam 73A.

As shown, the set screw 68 is threaded through an opening 74A in the bottom portion of the clip 67 and has an end shank portion 68A rotatably mounted in an opening 74B in the bottom portion of clip 66. The shank portion 68A has a headed end 68B which keeps the screw 68 retained in the opening 74B of clip 66. The screw 68 can be threaded to place it under compression (it bears on clip 66) to pivot the clips. The clips 66 and 67 will pivot on pivot pins 70, and thus inner surfaces of the end portion will act against the top cams 72A and 72B and the bottom cams 73A and 73B to move the slit edges 65 together to clamp the tube 62 onto a heater element (not shown). The adjustment screw 68 has an axis that extends parallel to the central axis of the tube 62 and thus parallel to the central axis of an injector barrel associated with the heater being clamped. The screw 68 can be adjusted with an adjustment tool such as a hex key or Allen wrench (similar to that shown in FIGS. 1 and 2).

Even when clamp 60 is located in a blind hole in an injection molding system, in this preferred embodiment, adjustment screw 68 is aligned substantially parallel to the axis of an injector barrel. The tool receiving end of the adjustment screw 68 can be easily seen and the adjustment tool can be rotated through a large arc, which reduces the number of times that the adjustment tool has to be inserted into the end of adjustment screw 68 to complete the tightening or adjustment operation.

The present invention provides a heater clamp for an injection molding system having clips extending about a tube which pivot with respect to the tube and act against cam surfaces on the tube when an adjustment screw is tightened. The adjustment screw is aligned substantially parallel to an injector barrel, such that it can be easily accessed for required adjustments.

Although the present invention has been described with reference to preferred embodiments, workers skilled in the art will recognize that changes may be made in form and detail without departing from the spirit and scope of the invention.

WHAT IS CLAIMED IS:

1. A clamp for securing, a heater element to an injector barrel, the clamp comprising:
   a tube disposed about the heater element and having a slit extending along the entire length of the tube to form spaced and facing slit edges extending between ends of the tube;
   a clip having a central clip portion spanning the slit edges being mounted on the tube to permit axial movement of the central clip portion along the tube;
   cam means for acting adjacent the slit edges; and
   means for moving the clip with respect to the tube in a direction axially along the tube such that the central clip portion actuates the cam means and urges the slit edges together to clamp the tube onto the heater element.

2. The clamp of claim 1 wherein the tube includes a plurality of tabs evenly spaced around the circumference of the tube and located on the inner surface of the tube for holding the heater element within the interior of the tube when clamping the tube onto the heater element.

3. The clamp of claim 2 wherein the tabs are located at both end of the tube.

4. The clamp of claim 1 and further comprising:
   first and second clips extending about portions of the tube and having central clip portions spanning the slit edges and mounted to permit axial movement of the central clip portion along the tube.

5. The clamp of claim 4 wherein the means for moving comprises a threadable screw rotatable about an axis parallel to the tube axis.

6. The clamp of claim 4 wherein the screw is threadably mounted through the first clip and the second clip includes an opening for rotatably mounting one end of the screw.

7. The clamp of claim 1 wherein the clip has leg portions that straddle the tube, and ears on the leg portions pivotally mounted on the tube.

8. The clamp of claim 1 wherein the cam means comprises aligning sloped surfaces formed on the tube on opposite sides of the slit, the central clip portion engaging and slidably acting on the aligning sloped surfaces for tending to compress the tube onto the heater element.

9. The clamp of claim 1 wherein the means for moving the clip with respect to the tube includes a pair of screws threaded through the clip and reacting loads into the tube, said screws having axes parallel to the tube axis.

10. The clamp of claim 7 and slot means formed in the wall of the tube on opposite sides thereof, and the ears being pivotally mounted in the slot means.

11. The clamp of claim 1 wherein the means for moving the clip with respect to the tube comprises an adjustment screw aligned substantially parallel to the injector barrel axis, said screw being threaded through the clip, and means to react load from the screw to cause the clip to ramp on the cam means to tighten the tube.

12. The clamp of claim 11 wherein the adjustment screws have actuator ends extending toward one end of the tube.

13. The clamp of claim 1 wherein the tube is formed in two sections which form two slits on diametrically opposite sides of the tube.

14. The clamp of claim 4 wherein the means for moving the clip with respect to the tube includes pivot pins which attach the first and second clips to one another.

15. A clamp for securing a heater element to an injector barrel, comprising:
   a tube disposed about the heater element having a slit extending along the entire length of the tube and forming slit edges extending between ends of the tube;
   a clip extending at least partially about the tube and having a central clip portion slidably engaging the tube adjacent the slit edges joined to a pair of clip pivots defining a pivotal axis substantially normal to the slit edges and extending through the tube at a location spaced away from the slit edges; and
   means for pivoting the clip with respect to the tube such that the central clip portion slides along the length of the tube to compress the tube around the heater element.

16. The clamp of claim 15 wherein the tube further comprises sloped surfaces slidingly engaging the central clip portion for reducing the pivotal stroke of the clip for a selected compression of the tube.

17. A heater assembly for an injector barrel, comprising:
   a heater element disposed around the injector barrel for heating the injector barrel;
   a tube disposed about the heater element having a slit extending along the tube's length and forming slit edges extending between ends of the tube;
   a clip extending about the tube having a central clip portion slidably engaging the tube by the slit edges joined to a pair of clip pivots defining a pivotal axis substantially normal to the slit edges and extending through the tube at a location spaced away from the slit edges; and
   means for pivoting the clip with respect to the tube such that the central clip portion slides along the length of the tube to compress the tube around the heater element.

* * * * *

UNITED STATES PATENT AND TRADEMARK OFFICE
CERTIFICATE OF CORRECTION

PATENT NO. : 4,859,176

DATED : August 22, 1989

INVENTOR(S) : Stephen R. Meyer

It is certified that error appears in the above-identified patent and that said Letters Patent is hereby corrected as shown below:

On the title page:

Under the References Cited Section, add OTHER PUBLICATIONS and list the following citation:

Catalog pages A1.1, A3.0 and A5.0 for Husky Injection Molding Syste, Publication Date Unknown Column 3, line 42, delete "treaded" and insert therefore --threaded--.

Column 6, line 39, delete "end" and insert therefore --ends--.

Signed and Sealed this

Tenth Day of April, 1990

Attest:

HARRY F. MANBECK, JR.

*Attesting Officer*     *Commissioner of Patents and Trademarks*